US010837285B2

(12) United States Patent
Ramm et al.

(10) Patent No.: US 10,837,285 B2
(45) Date of Patent: Nov. 17, 2020

(54) BLADE, BLADE RING, BLADE RING SEGMENT AND TURBOMACHINE

(71) Applicant: MTU Aero Engines AG, Munich (DE)

(72) Inventors: Guenter Ramm, Eichenau (DE); Yavuz Guendogdu, Munich (DE)

(73) Assignee: MTU Aero Engines AG, Munich (DE)

( * ) Notice: Subject to any disclaimer, the term of this patent is extended or adjusted under 35 U.S.C. 154(b) by 302 days.

(21) Appl. No.: 16/038,341

(22) Filed: Jul. 18, 2018

(65) Prior Publication Data
US 2019/0048725 A1 Feb. 14, 2019

(30) Foreign Application Priority Data

Jul. 19, 2017 (DE) .................. 10 2017 212 310

(51) Int. Cl.
*F01D 5/14* (2006.01)
*F01D 9/04* (2006.01)
(52) U.S. Cl.
CPC ............. *F01D 5/141* (2013.01); *F01D 9/041* (2013.01); *F05D 2220/323* (2013.01); *F05D 2240/301* (2013.01); *F05D 2250/14* (2013.01)
(58) Field of Classification Search
CPC .......... F01D 5/141; F01D 5/147; F01D 9/041; F05D 2240/121; F05D 2240/123;
(Continued)

(56) References Cited

U.S. PATENT DOCUMENTS 4,795,312 A * 1/1989 Purcaru .................. F01D 5/141
416/223 A
5,209,644 A 5/1993 Dorman et al.
(Continued)

FOREIGN PATENT DOCUMENTS

DE 102015224283 A1 6/2017
EP 0082100 A2 6/1983
(Continued)

OTHER PUBLICATIONS

Wright et al.:"Blade selection for a modern axial-flow compressor," Jan. 1, 1974, downloaded from https://ntrs.nasa.gov/archive/nasa/casi.ntrs.nasa.gov/19750003128.pdf.

*Primary Examiner* — Ninh H. Nguyen
(74) *Attorney, Agent, or Firm* — Davidson, Davidson & Kappel, LLC

(57) ABSTRACT

A blade (10) for a turbomachine is provided. In at least one cross section disposed orthogonally to a longitudinal blade axis, an outer surface of the blade forms a curve (Γ) that runs continuously on the inflow side along an at least approximate ellipse (E) between a first separation point ($P_1$) and a second separation point ($P_2$). On the pressure side 12, the curve (Γ) has an inflection point W. A distance of the second separation point ($P_2$) from the inflection point W along the curve is at least exactly equal, at least twice as great, at least three times as great, or even at least five times as great as a distance of the second separation point ($P_2$) from the first separation point ($P_1$) along the at least approximate ellipse (E). Also described is a blade ring having at least one blade of this kind, as well as a turbomachine.

20 Claims, 3 Drawing Sheets

(58) Field of Classification Search
CPC ......... F05D 2240/303; F05D 2240/305; F05D 2240/301; F05D 2250/14; F05D 2250/141
See application file for complete search history.

(56) References Cited

U.S. PATENT DOCUMENTS

| | | | | |
|---|---|---|---|---|
| 5,393,198 | A * | 2/1995 | Noda | F01D 5/187 |
| | | | | 415/115 |
| 6,572,335 | B2 | 6/2003 | Kuwabara et al. | |
| 7,179,058 | B2 * | 2/2007 | Chandraker | F01D 5/141 |
| | | | | 416/223 A |
| 8,326,573 | B2 * | 12/2012 | Jackson | G01B 21/20 |
| | | | | 702/167 |
| 9,046,111 | B2 * | 6/2015 | Harvey | F04D 29/324 |
| 2014/0278158 | A1 | 9/2014 | Miller | |
| 2014/0369841 | A1 | 12/2014 | Duchene et al. | |
| 2017/0159465 | A1 | 6/2017 | Schlemmer et al. | |
| 2017/0218784 | A1 * | 8/2017 | Feldmann | F01D 11/005 |

FOREIGN PATENT DOCUMENTS

| | | |
|---|---|---|
| WO | WO2009/103528 | 8/2009 |
| WO | WO2014189902 A1 | 11/2014 |

* cited by examiner

BLADE, BLADE RING, BLADE RING SEGMENT AND TURBOMACHINE

This claims the benefit of German Patent Application DE102017212310.9, filed Jul. 19, 2017 and hereby incorporated by reference herein.

The present invention relates to a blade, in particular to a turbine blade or compressor blade, that can be designed as a guide vane or rotor blade, to a blade ring and a blade ring segment, in each case for a turbomachine, as well as to a turbomachine.

BACKGROUND

To set optimal operating conditions in the flow channel thereof (also referred to as the "annular space"), turbomachines, such as aircraft engines and stationary gas turbines, often have at least one blade ring, for example, a rotor blade ring. In addition, one or a plurality of guide vane rings can also be provided. Each guide vane ring and/or rotor blade ring can be composed of individual blade ring segments, which can each include exactly one, exactly two or more blades.

A blade ring includes an inner ring and a plurality of blades, whose one end is mounted on the inner ring and which extend radially outwardly therefrom; as used herein and unless otherwise stated, the terms "radial," "axial," and "in the circumferential direction" always relate to a central geometric axis of the blade ring, respectively of the inner ring, which, for the sake of better readability, is not always specially formulated. To the extent that the respective terms relate to single components of the blade ring, they are to be understood with reference to the indicated orientation of the respective single component in the turbomachine.

The blades each have a pressure side and a suction side. The pressure side of each blade faces the suction side of an adjacent blade. During operation of the turbomachine, the pressure side and the suction side of a blade are each mutually separated by an "inflow-side" leading region and by an "outflow-side" trailing region disposed on the opposite side; the transition at the outer surface of the blade is thereby preferably formed to be smooth, respectively edgeless.

In cross section orthogonally to a longitudinal axis of a blade (and in a region spaced apart from a platform of the blade), the outer surface of the blade describes a closed curve. The respective characteristic thereof influences the efficiency of the turbomachine.

SUMMARY OF THE INVENTION

It is an object of the present invention to enhance the efficiency of a turbomachine.

The a blade for a, by a blade ring, by a blade ring segment, and by a turbomachine.

A blade according to the present invention for a turbomachine has at least one cross section disposed orthogonally to a longitudinal blade axis, where an outer surface of the blade forms a closed curve that runs on the inflow side between a first and a second separation point continuously along an ellipse and/or without any abrupt changes in curvature approximately along an ellipse and, toward the suction side (respectively, on the suction side), that separates at the first separation point without any abrupt changes in curvature and, toward the pressure side (respectively, on the pressure side), as well as at the second separation point (different from the first) without any abrupt changes in curvature, in each case from the ellipse, respectively the approximate ellipse; thus, the shared portion of the curve and of the ellipse, respectively of the approximate ellipse ends toward the suction side at the first separation point (which, in particular, may be located on the suction side) and, toward the pressure side, at the second separation point (which, in particular, may be located on the pressure side).

Without any abrupt changes in curvature means that the value of the curve curvature changes at most continuously, but not suddenly along the curve.

"Along an ellipse and/or approximately along an ellipse," which also implies along a circle and/or approximately along a circle, means that the curve does not necessarily run exactly along an elliptical segment, which, in the case of a circular segment, has a constant curvature, rather may deviate therefrom to a certain degree, in particular only to the point where the curve also runs through the two separation points, respectively without any abrupt changes in curvature at the first and second separation point. Approximately along an ellipse may thereby mean that the deviation from a particular, nearest elliptical shape is at most 5% or less, specifically at most 3% or less from the large and/or small half-axis of the respective, nearest ellipse.

In the following description, "ellipse and/or approximate ellipse," respectively "along an ellipse and/or approximately along an ellipse" are referred to in simpler terms as "ellipse," respectively as "along an ellipse," whereby, unless explicitly indicated, the essential meaning should not be altered, however.

At the first separation point, the ellipse and the curve preferably have a common tangent; this holds analogously for the second separation point. In particular, the ellipse may preferably be a circle.

On the pressure side of the blade, the curve has an inflection point, where (for the first time) it changes the curvature direction thereof (starting from the first separation point). The distance of the second separation point from the inflection point along the curve is thereby at least exactly equal, at least twice as great, at least three times as great, or even five times as great as the distance of the second separation point from the first separation point along the ellipse (and thus also along the curve); thus, the distances are specified by the length of the particular portion of the curve.

Thus, the curve maintains the curvature direction thereof in an inflow region which extends from the first separation point to the inflection point on the pressure side. This makes it possible to minimize substantial changes in the axial pressure profile near a leading edge of the blade during operation of the turbomachine in a stagnation point region within which the pressure is at a maximum and the velocity of the flow is zero. It is thus possible to even out the pressure profile and avoid a pressure-side separation. An airflow pattern toward the suction side may thereby be enhanced, whereby an efficiency may be improved.

In a portion of the longitudinal blade axis, each cross section of the blade is preferably formed accordingly, thus has some or all of the features described above or also further below. The portion may preferably include at least half of the length or at least two thirds of the length of the blade (thus of a radial extent from an inner to a radially outer platform of the blade).

In accordance with an advantageous specific embodiment, the distance of the second separation point from the inflection point along the curve is at most ten times or even eight times as great as the distance of the second separation point from the first separation point along the ellipse. A resulting region in which the inflection point is located has proven to be particularly advantageous.

A first tangent to the ellipse (respectively, the curve) at the first separation point and a second tangent to the ellipse (respectively, curve) at the second separation point form an angle in which the ellipse is located. This angle is preferably at least 70°, preferably at least 80° or even at least 90°. Such an angle signifies a relatively obtuse, inflow-side leading region of the blade (in the cross section) which obviates the need for accumulating material and thereby disadvantageously affecting thermal loading.

A specific embodiment is especially advantageous where the blade is formed as a hollow body at least in the region of the at least one cross section, a maximally occurring wall thickness of the blade between the first and second separation point being at most 110%, preferably at most 105% of twice the small half-axis of the ellipse; in the case that the ellipse is formed as a circle, the maximum wall thickness in the mentioned region is, therefore, at most 110%, preferably at most 105% of the diameter of the circle. Wall thickness is thereby understood to be the respective minimum distance to a point at the inner surface of the hollow body at every point between the first and second separation point.

This makes possible a uniform distribution of material, especially obviates the need for accumulating material in the region of the ellipse, thereby resulting in an advantageously low thermomechanical loading.

The maximally occurring wall thickness between the first and second separation point may preferably be at least 90%, preferably at least 95% of twice the small half-axis of the ellipse. This results in a relatively small underlying ellipse in the context of an advantageously small wall thickness (in the sense of a weight reduction) and thus in a large curvature of the outer surface in this region.

In accordance with a preferred specific embodiment, an inventive blade is configured as a hollow body at least in the region of the at least one cross section, a maximally occurring wall thickness of the blade between the first and second separation point being at most 2 mm, at most 1.5 mm or at most 1 mm; as mentioned, the wall thickness at each point is determined to be the respective minimum distance of the point at the outer surface to a point at the inner surface of the hollow body; the "maximum wall thickness" is thus the maximally occurring wall thickness value from all points between the separation points.

Preferably, the curve formed by the outer surface at a trailing edge of the blade (thus, in an outflow side region) runs between a third separation point and a fourth separation point, continuously along a further ellipse, in particular a circle. A design variant is preferred where the curve maintains a curvature direction that first changes at the mentioned inflection point (and then again at another pressure-side inflection point) on the path from the third separation point (in succession) via the fourth separation point, along the suction side to the first separation point, further via the second separation point and continuously to the inflection point.

A blade according to the present invention may be immovably attached to the inner ring or be adjustable (thus, be pivotable about an indicated, essentially radially extending axis of rotation (that preferably conforms with a longitudinal axis of the blade)).

A blade ring according to the present invention includes an inner ring and one or a plurality of blades in accordance with one of the specific embodiments described in this document. In particular, the blade ring may be part of a compressor.

A blade ring segment according to the present invention includes exactly one, exactly two or more blades in accordance with one or a plurality of the aforementioned specific embodiments.

A turbomachine according to the present invention encompasses at least one compressor stage and/or turbine stage that includes at least one inventive blade ring in accordance with one of the specific embodiments described herein. In particular, the turbomachine may be an aircraft engine.

BRIEF DESCRIPTION OF THE DRAWINGS

Preferred exemplary embodiments of the present invention will be described in greater detail below with reference to the drawing. It is understood that individual elements and components may be combined in ways other than those described. Reference numerals for mutually corresponding elements are used throughout the figures and, as the case may be, are not respecified for each figure.

In the schematic drawing.

DETAILED DESCRIPTION

Figure 1:
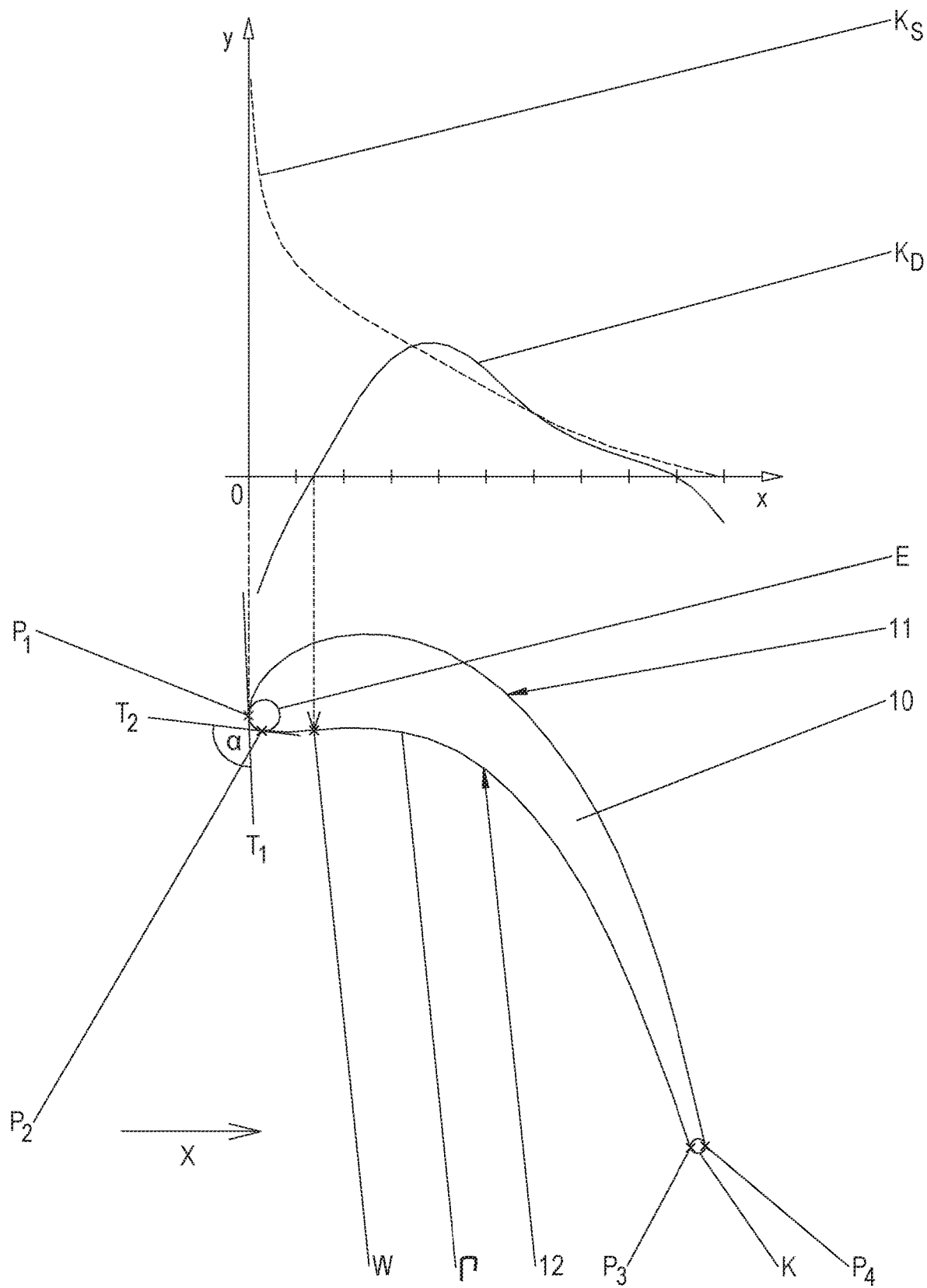
FIG. 1: shows the characteristic curve of an outer surface of a blade in accordance with a specific embodiment of the present invention in cross section together with a corresponding functional representation of the curvature profile of the outer surface.

In the lower portion, FIG. 1 schematically shows an outer surface of an exemplary inventive blade 10 in a cross section orthogonally to a longitudinal blade axis. Blade 10 has a suction side 11 and a pressure side 12; an indicated primary flow direction X is from left to right in the figure.

In the cross section perpendicularly to the longitudinal blade axis, the outer surface of the illustrated blade forms a closed curve $\Gamma$ which runs on the inflow side along an ellipse E that, in accordance with the aforementioned definition, also includes an approximate, respectively almost ellipse; in the illustrated example, ellipse E is formed as a circle. The shared portion of the curve and of ellipse E ends toward the suction side of the blade at a first separation point $P_1$ where curve $\Gamma$ separates from the ellipse (in the indicated through-flow direction). Following in the opposite direction (thus, toward suction side 11 of the blade), curve $\Gamma$ separates from ellipse E at a second separation point $P_2$; thus, in this direction, the shared portion of curve $\Gamma$ and of ellipse E ends at second separation point $P_2$. Along the shared portion and at separation points $P_1$ and $P_2$, curve $\Gamma$ is free of any abrupt changes in curvature, i.e., even in the regions of separation points $P_1$ and $P_2$, there is no abrupt change, respectively no discontinuity in the curvature profile of curve $\Gamma$.

A first tangent $T_1$ to curve $\Gamma$ at first separation point $P_1$ and a second tangent $T_2$ to curve $\Gamma$ at second separation point $P_2$ form an angle in which the ellipse is located; this angle, whose opposite angle is characterized in FIG. 1 as $\alpha$, is more than 90° here.

In the illustrated cross section, blade 10 thereby forms an obtuse, inflow-side leading region.

On the outflow side, thus in the trailing region of the blade, curve Γ runs in the example shown between a third separation point $P_3$ and a fourth separation point $P_4$ continuously along another ellipse K, which, in the illustrated exemplary embodiment, is formed as a circle, similarly to ellipse E. Curve Γ separates from further ellipse K toward pressure side 12 at third separation point $P_3$ and, toward suction side 11, at fourth separation point $P_4$. In the illustrated, advantageous specific embodiment, the small half-axis (thus, here, the radius) of ellipse E (likewise formed as a circle) is at most three times, at most two and a half times, or even at most twice as great as the small half-axis (here, the radius) of further ellipse K.

Starting from the inflow-side leading region, respectively first separation point $P_1$, the curve changes the curvature direction thereof (for the first time) along the continuation path thereof at an inflection point W on pressure side 12 of blade 10. This is readily discernible by the curvature profiles of curve Γ illustrated in the upper portion of FIG. 1: Function graph $K_D$, illustrated as a solid line in the figure, shows the curvature of curve Γ in the area of pressure side 12, in each case as a function of an extent x of blade 10 at the outer surface thereof in indicated primary flow direction X, and function graph $K_S$ plotted as a dashed line represents the curvature of curve Γ on suction side 11 of the blade. The first zero crossing of function graph $K_D$ marks inflection point W on pressure side 12 of blade 10. As is discernible in the figure, the distance of second separation point $P_2$ from the inflection point that is measured along curve Γ is greater than the distance of second separation point $P_2$ from first separation point $P_1$ that is measured along curve Γ.

Figure 2:
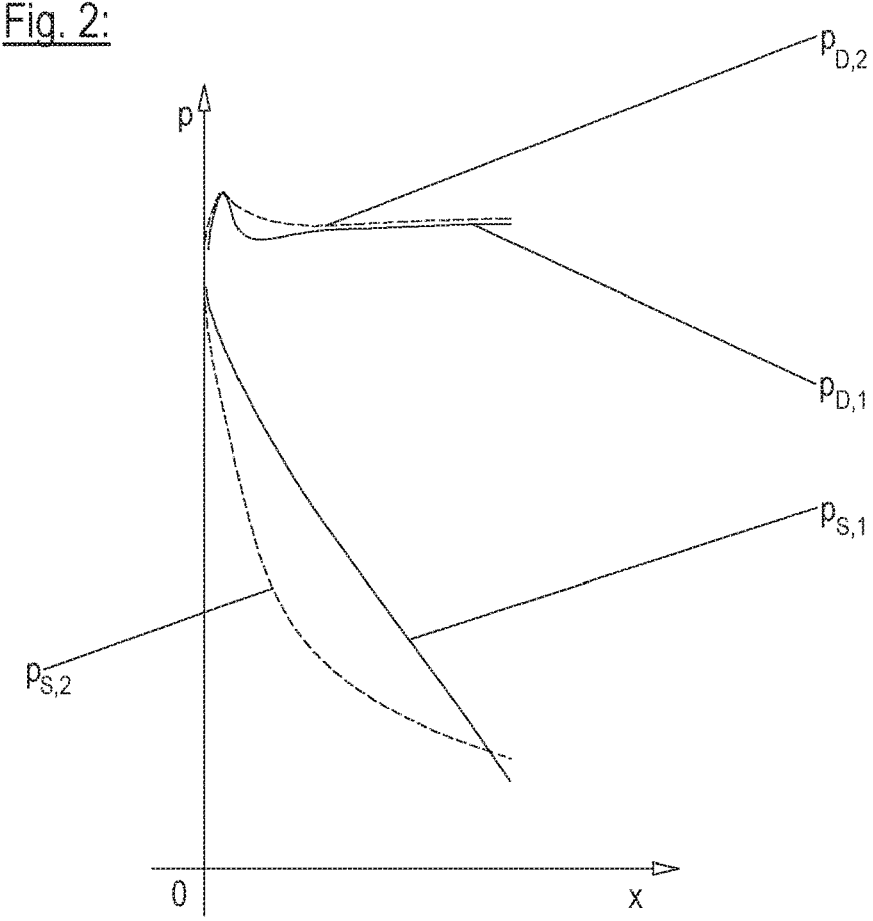
FIG. 2: pressure profiles on the pressure side and suction side in a comparison of conventional blades and inventive blades.

Thus, on pressure side 12, inflection point W is spaced relatively far from the inflow-side leading region. This makes it possible to minimize changes, respectively differences in the pressure profile: This is discernible in FIG. 2, where the pressure on the suction side and on the pressure side are each plotted as a function whose variable x represents the extent of blade 10 at the outer surface thereof in primary flow direction X. Graphs $p_{D,1}$ and $p_{S,1}$ plotted as solid lines—for the pressure side and, respectively the suction side—show the pressure profile of a conventional blade where the inflow-side leading region runs along a circular path, and the outer surface toward the pressure side separates from the circular path at an inflection point. Namely, graph $p_{D,1}$ shows that a pronounced change in pressure occurs on the pressure side (relative to primary flow direction X) downstream of a stagnation point in the inflow region of the blade (thus, downstream of a point where the gas flowing through has the highest pressure and a velocity of zero).

On the other hand, the inflection point located further downstream in accordance with the present invention results in a pressure profile as shown by dashed-line graphs $p_{D,2}$ and $p_{S,2}$ for the pressure side, respectively the suction side. Specifically, graph $p_{D,2}$ shows a pressure differential that is significantly reduced in comparison to conventional profile $p_{D,1}$. This makes it possible to avoid a pressure-side separation, thereby enhancing efficiency.

Figure 3:
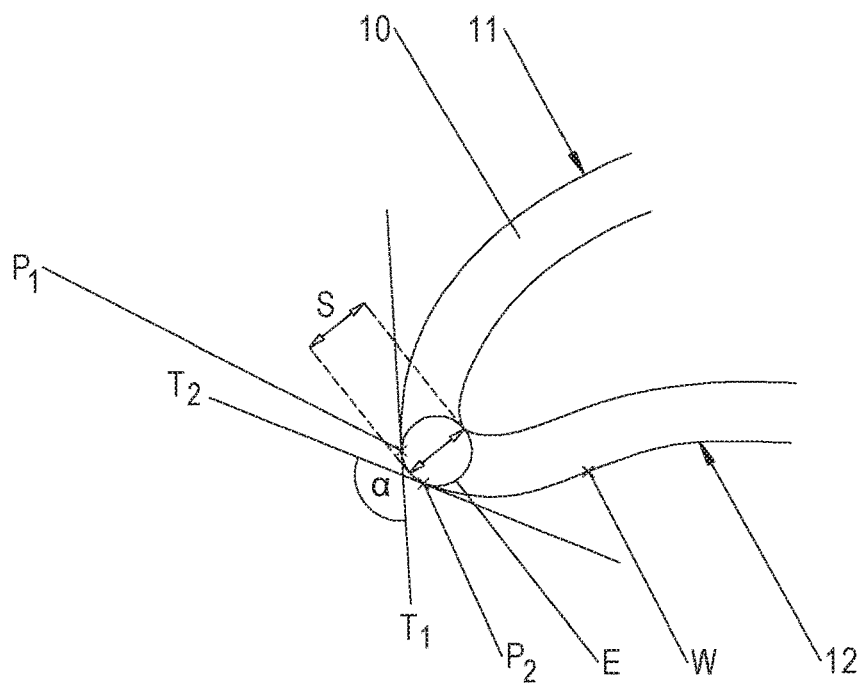
FIG. 3: a detail view from a cross section through an exemplary inventive blade at the inflow region thereof including an outer and an inner surface.

FIG. 3 shows a detail view of a cross section through an exemplary inventive blade 10 at the inflow region thereof. As is discernible, the blade is formed in the region as a hollow body. The outer surface of the blade extends continuously between a first separation point $P_1$ and a second separation point $P_2$ along an ellipse E, which is formed as a circle here. A first tangent $T_1$ to outer surface at first separation point $P_1$ and a second tangent $T_2$ to outer surface at second separation point $P_2$ form an angle in which the ellipse is located; this angle, whose opposite angle is characterized in the figure as α, is more than 90° here.

At every point of the outer surface, the blade has a wall thickness that is defined in each case as the minimum distance to a point on the inner surface of the hollow body; FIG. 3 characterizes a maximally occurring wall thickness S of the blade between first and second separation point $P_1$, $P_2$. A maximum wall thickness of this kind is preferably at most 110%, preferably at most 105% of twice the small half-axis of ellipse E; in the illustrated example, S is exactly equal to twice the small half-axis of ellipse E, which, in the case of the ellipse formed as a circle, is the diameter thereof.

Maximum wall thickness S may preferably be at most 2 mm, at most 1.5 mm or at most 1 mm.

A blade 10 for a turbomachine is described. In at least one cross section disposed orthogonally to a longitudinal blade axis, an outer surface of the blade forms a curve Γ which runs continuously along an ellipse E between a first separation point $P_1$ and a second separation point $P_2$. On pressure side 12, curve Γ has an inflection point W. A distance of second separation point $P_2$ from inflection point W along the curve is at least exactly equal, at least twice as great, at least three times as great, or even at least five times as great as a distance of second separation point $P_2$ from first separation point $P_1$ along ellipse E.

Figure 4:
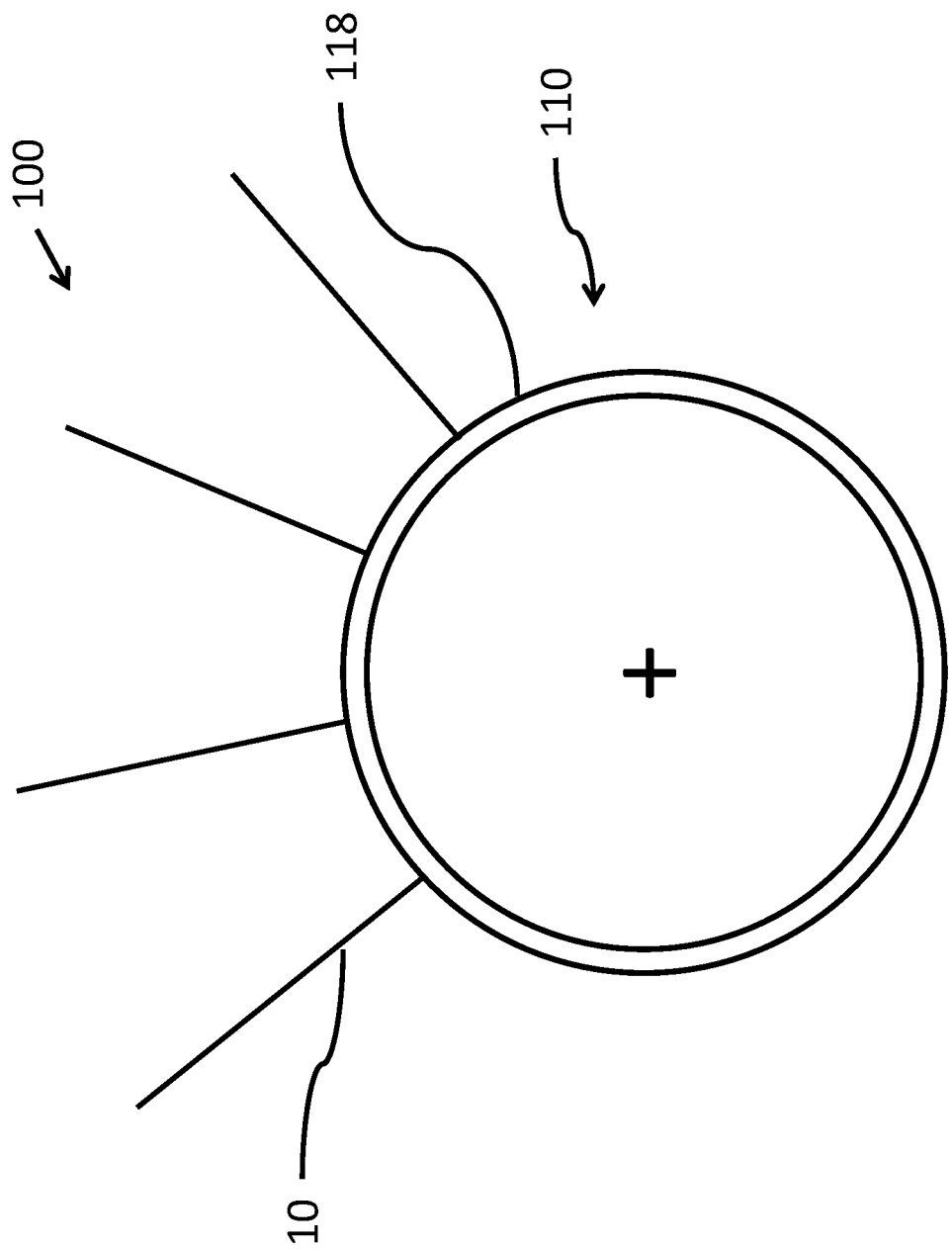
FIG. 4 shows highly schematically the blade ring and turbomachine having the blades as in FIG. 1

Also described in a highly schematicized view in FIG. 4 is a blade ring 110 having an inner ring 118, at least one blade 10, as well as a turbomachine 100. The cross section can extend over at least a third or more of the longitudinal axis of the blade 10.

REFERENCE NUMERAL LIST

10 blade
11 suction side
12 pressure side
100 turbomachine
110 blade ring
118 inner ring
α opposite angle to the angle between tangents $T_1$ and $T_2$, in which ellipse E is located
Γ curve formed from the outer surface of the blade, in cross section
E ellipse (on the inflow side)
K ellipse (on the outflow side)
$K_D$ curvature profile of the outer surface on pressure side 12
$K_S$ curvature profile of the outer surface on suction side 11
$p_{D,1}$ inflow-side pressure profile in the case of a conventional blade on the pressure side
$p_{D,2}$ inflow-side pressure profile in the case of a blade 10 according to the present invention on pressure side 12
$p_{S,1}$ inflow-side pressure profile in the case of a conventional blade on the suction side
$p_{D,2}$ inflow-side pressure profile in the case of a blade 10 according to the present invention on pressure side 11
$P_1$ first separation point
$P_2$ second separation point
$P_3$ third separation point
$P_4$ fourth separation point
S maximum wall thickness of the blade between the first and second separation point
$T_1$ first tangent
$T_2$ second tangent
X indicated primary flow direction

What is claimed is:

1. A blade for a turbomachine, the blade comprising:
at least one cross section disposed orthogonally to a longitudinal blade axis, an outer surface of the blade forming a curve running continuously on an inflow side along an ellipse between a first separation point and a second separation point along the ellipse or without any abrupt changes in curvature approximately along the ellipse;
the first separation point, the curve separating from the ellipse, toward a suction side and, at the second separation point, toward a pressure side, in each case without any abrupt changes in curvature;
in addition, the curve having an inflection point on the pressure side; and a first distance of the second separation point from the inflection point along the curve being at least exactly equal or greater as a second distance of the second separation point from the first separation point along the ellipse; wherein the first distance is at least five times as great as the second distance.

2. The blade as recited in claim 1 wherein the first distance is at most ten times as great as the second distance.

3. The blade as recited in claim 1 wherein the first distance is at most eight times as great as the second distance.

4. The blade as recited in claim 1 wherein the ellipse defines an angle between a first tangent at the first separation point and a second tangent at the second separation point of at least 70°.

5. The blade as recited in claim 4 wherein the angle at least 80°.

6. The blade as recited in claim 4 wherein the angle at least 90°.

7. A blade ring comprising an inner ring and the blade as recited in claim 1.

8. A blade ring segment comprising the blade as recited in claim 1.

9. A turbomachine comprising a compressor stage or turbine stage comprising the blade ring segment as recited in claim 8.

10. An aircraft engine or turbofan aircraft engine comprising the turbomachine as recited in claim 9.

11. A blade for a turbomachine, the blade comprising:
at least one cross section disposed orthogonally to a longitudinal blade axis, an outer surface of the blade forming a curve running continuously on an inflow side along an ellipse between a first separation point and a second separation point along the ellipse or without any abrupt changes in curvature approximately along the ellipse;
the first separation point, the curve separating from the ellipse or the approximate ellipse, toward a suction side and, at the second separation point, toward a pressure side, in each case without any abrupt changes in curvature;
in addition, the curve having an inflection point on the pressure side; and a first distance of the second separation point from the inflection point along the curve being at least exactly equal or greater as a second distance of the second separation point from the first separation point along the ellipse; wherein a hollow body at least in the region of the at least one cross section has a maximally occurring wall thickness between the first and second separation point of at most 110% of twice a small half-axis of the ellipse or being at least 90% of the small half-axis.

12. The blade as recited in claim 11 wherein the hollow body at least in the region of the at least one cross section has a maximally occurring wall thickness between the first and second separation point of at most 105% of twice the small half-axis or being at least 95% of the small half-axis.

13. The blade as recited in claim 11 wherein the maximally occurring wall thickness between the first and second separation point is at most 2 mm.

14. The blade as recited in claim 11 wherein the maximally occurring wall thickness between the first and second separation point is at most 1.5 mm.

15. The blade as recited in claim 11 wherein the maximally occurring wall thickness between the first and second separation point is at most 1 mm.

16. The blade as recited in claim 11 wherein in at least one portion of the longitudinal blade axis, each cross section orthogonal to the longitudinal blade axis has the at least one cross section.

17. The blade as recited in claim 16 wherein the at least one portion extends at least one third, at least one half, or at least two thirds of the length of the blade.

18. A blade ring comprising an inner ring and the blade as recited in claim 11.

19. A turbomachine comprising a compressor stage or turbine stage comprising the blade ring segment as recited in claim 18.

20. An aircraft engine or turbofan aircraft engine comprising the turbomachine as recited in claim 18.

* * * * *